(12) United States Patent
Nonin et al.

(10) Patent No.: US 11,462,064 B2
(45) Date of Patent: Oct. 4, 2022

(54) DISTANCE MEASUREMENT APPARATUS AND DISTANCE MEASUREMENT METHOD

(71) Applicants: Kabushiki Kaisha Toshiba, Tokyo (JP); Toshiba Electronic Devices & Storage Corporation, Tokyo (JP)

(72) Inventors: Katsuya Nonin, Kawasaki Kanagawa (JP); Masaki Nishikawa, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 233 days.

(21) Appl. No.: 16/802,262

(22) Filed: Feb. 26, 2020

(65) Prior Publication Data

US 2021/0065484 A1 Mar. 4, 2021

(30) Foreign Application Priority Data

Aug. 26, 2019 (JP) .............................. JP2019-154036

(51) Int. Cl.
*G07C 9/00* (2020.01)
*G01S 13/76* (2006.01)

(52) U.S. Cl.
CPC ........ *G07C 9/00309* (2013.01); *G01S 13/765* (2013.01); *G07C 2009/00555* (2013.01); *G07C 2209/63* (2013.01)

(58) Field of Classification Search
None
See application file for complete search history.

(56) References Cited

U.S. PATENT DOCUMENTS

| 9,024,810 B2 | 5/2015 | Lohbihler |
| 10,502,808 B2 | 12/2019 | Nishikawa |
| 2012/0077513 A1 | 3/2012 | Rizzello et al. |
| 2015/0309154 A1 | 10/2015 | Lohbihler |

(Continued)

FOREIGN PATENT DOCUMENTS

| EP | 3517995 A1 | 7/2019 |
| JP | 2010-066235 A | 3/2010 |

(Continued)

*Primary Examiner* — Carlos Garcia
(74) *Attorney, Agent, or Firm* — Allen & Overy LLP

(57) ABSTRACT

A distance measurement apparatus includes a calculation unit configured to calculate, based on phase information acquired by two distance measurement units at least one of which is movable, a distance between the two distance measurement units. One of the two distance measurement units includes an RSSI estimation unit configured to estimate, from respective three receiving signal intensities of three first carrier signals or respective three receiving signal intensities of three second carrier signals, the receiving signal intensity of a frequency having an average value, and a fading correction value calculation unit configured to calculate a fading correction value for the distance from the receiving signal intensity of a lowest frequency and the receiving signal intensity of a highest frequency. The calculation unit calculates the distance using a phase detection result obtained by receiving the three first carrier signals and the three second carrier signals and the fading correction value.

6 Claims, 13 Drawing Sheets

(56) References Cited

U.S. PATENT DOCUMENTS

| | | |
|---|---|---|
| 2016/0223636 A1 | 8/2016 | Lohbihler |
| 2019/0101614 A1 | 4/2019 | Lohbihler |
| 2019/0120925 A1 | 4/2019 | Lohbihler |
| 2019/0227141 A1 | 7/2019 | Nishikawa |
| 2020/0081088 A1 | 3/2020 | Nishikawa |
| 2022/0085951 A1* | 3/2022 | Lee .................. H04L 1/18 |

FOREIGN PATENT DOCUMENTS

| | | |
|---|---|---|
| JP | 5936405 B2 | 6/2016 |
| JP | 6218785 B2 | 10/2017 |
| JP | 2018-155724 A | 10/2018 |
| JP | 2018-155725 A | 10/2018 |
| KR | 101862285 B1 | 5/2018 |

* cited by examiner

DISTANCE MEASUREMENT APPARATUS AND DISTANCE MEASUREMENT METHOD

CROSS-REFERENCE TO RELATED APPLICATION

This application is based upon and claims the benefit of priority from the prior Japanese Patent Application No. 2019-154036 filed in Japan on Aug. 26, 2019; the entire contents of which are incorporated herein by reference.

FIELD

Embodiments described herein relate to a distance measurement apparatus and a distance measurement method.

BACKGROUND

In recent years, a keyless entry system for facilitating locking and unlocking of a vehicle has been adopted in many automobiles. Such a technique enables a user of an automobile to lock and unlock a door using communication between a key of the automobile and the automobile. Further, in recent years, a smart key system capable of locking and unlocking a door and starting up an engine without a user touching a key has widely spread.

On the other hand, a case where an attacker enters communication between a key and an automobile and steals the automobile or goods in the automobile has frequently occurred. As a preventive measure against such an attack, i.e., a so-called relay attack, a countermeasure to measure a distance between the key and the automobile and prevent a door from being unlocked when it is judged that the distance is a predetermined distance or more has been discussed.

However, to implement both extension of a distance to be measured and elimination of a multi-path effect more continuous wave signals need to be transmitted and received between two devices so that it takes time to measure the distance.

DETAILED DESCRIPTION

Figure 1:
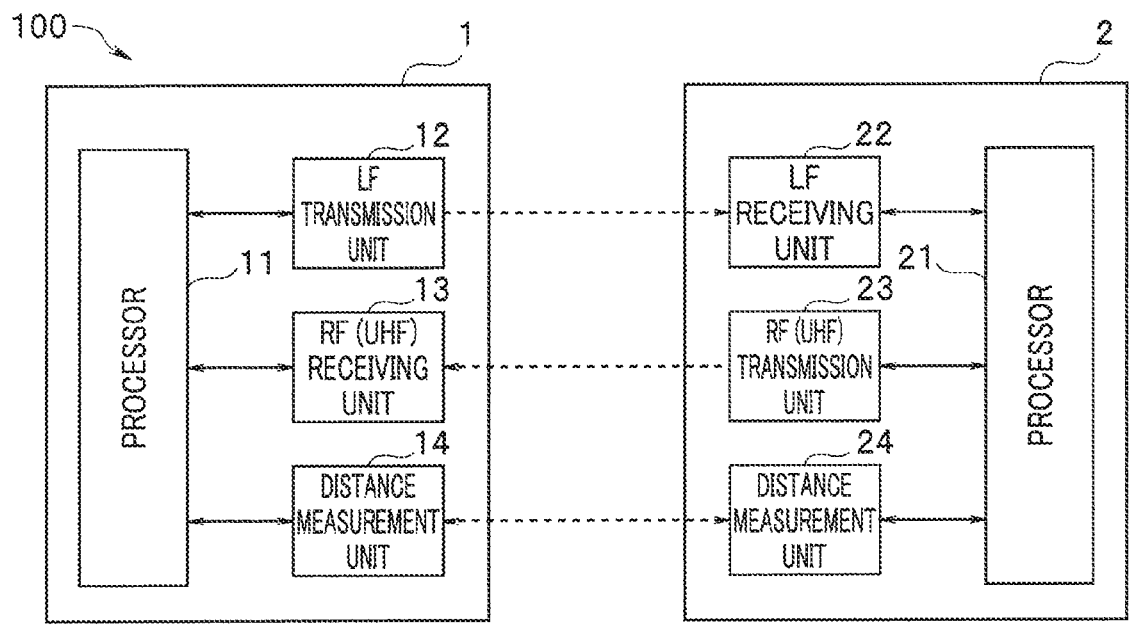
FIG. 1 is a configuration diagram of a wireless communication system including a distance measurement apparatus according to an embodiment.

A distance measurement apparatus according to an embodiment includes, in a distance measurement apparatus that calculates a distance based on carrier phase detection, a calculation unit configured to calculate, based on phase information acquired by a first device and a second device at least one of which is movable, a distance between the first device and the second device, in which the first device includes a first reference signal source, a first transmitter/receiver configured to transmit three first carrier signals respectively having different frequencies and receive three second carrier signals respectively having same frequencies as the frequencies of the three first carrier signals using an output of the first reference signal source, a frequency between a lowest frequency and a highest frequency among the three frequencies being a frequency that deviates from an average value of the lowest frequency and the highest frequency, a first receiving signal intensity measurement unit configured to measure a receiving signal intensity of each of the three second carrier signals, an estimation unit configured to estimate a receiving signal intensity of the frequency having the average value from at least one of respective three receiving signal intensities of the three first carrier signals and the respective three receiving signal intensities of the three second carrier signals, and a fading correction value calculation unit configured to calculate a fading correction value for the distance from the receiving signal intensity of the frequency having the average value, the receiving signal intensity of the lowest frequency, and the receiving signal intensity of the highest frequency, the second device includes a second reference signal source configured to operate independently of the first reference signal source, and a second transmitter/receiver configured to transmit the three second carrier signals and receive the three first carrier signals using an output of the second reference signal source, and the calculation unit calculates the distance using a phase detection result obtained by receiving the three first carrier signals and the three second carrier signals while correcting the calculated distance using the fading correction value.

Although examples of a distance measurement method include a time detection method, a frequency difference detection method, and a phase detection method, a distance measurement apparatus adopting a communication type phase detection method for finding a distance between devices by communication between the devices has been paid attention to because of simplicity of mounting. Generally in the communication type phase detection method, reference signals between the devices independently operate because their respective initial phases differ from each other. Accordingly, a distance measurement accuracy greatly degrades.

A distance measurement method for transmitting and receiving two or more continuous wave (CW) signals between the two devices and transmitting phase information of each of the continuous wave signals detected by one of the devices to the other device to enable distance measurement has been proposed. The proposed distance measurement method enables highly accurate calculation of a distance by performing a predetermined operation using two pieces of phase information detected by respective receiving units in paired two devices.

It has been proposed to eliminate a multi-path effect in such a distance measurement method. In a method by the proposal to eliminate the multi-path effect, the multi-path effect can be eliminated using respective receiving powers of three or more continuous wave signals.

On the other hand, it is also desired to extend a distance that can be measured in distance measurement. The distance that can be measured can be extended by using the three or more continuous wave signals, for example. When the three or more continuous wave signals are used, the distance that can be measured can be further extended if the respective frequency differences are not the same.

An embodiment of a distance measurement apparatus capable of extending a distance that can be measured while eliminating a multi-path effect will be described below with reference to the drawings.

(Configuration)

Figure 2:
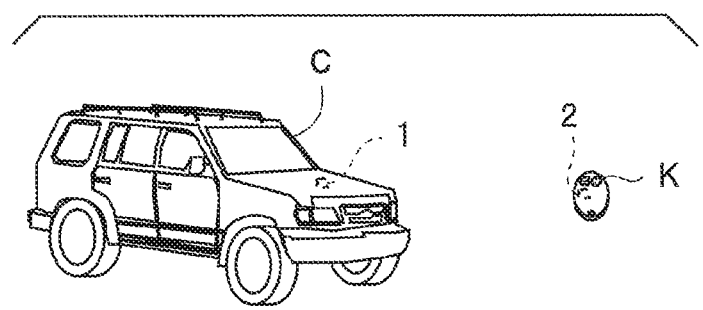
FIG. 2 is a configuration diagram for describing a smart key system to which the wireless communication system according to the embodiment is applied.

FIG. 1 is a configuration diagram of a wireless communication system including a distance measurement apparatus according to the present embodiment. FIG. 2 is a configuration diagram for describing a smart key system to which the wireless communication system according to the present embodiment is applied. At least one of a device 1 and a device 2 is movable.

A smart key system 100 is configured to include an automobile C and a key K configured to lock and unlock a door of the automobile C and start up an engine. More specifically, the smart key system 100 performs wireless communication according to a predetermined protocol between the device 1 loaded into the automobile C and the device 2 contained in the key K, to enable the door to be locked, for example, when the key K is correctly authenticated in the automobile. In the smart key system 100, a distance between the device 1 and the device 2 is calculated based on carrier phase detection, as described below.

When a user enters an LF (low frequency) area as an area where an LF signal can be received, in the device 1 loaded into the automobile C, authentication is performed. The LF signal is a beacon signal as a radio signal in a 130 KHz band, for example. The device 2 contained in the key K transmits identification code information upon receiving the beacon signal, and the device 1 performs authentication based on the received identification code information. A radio signal in a UHF band, i.e., a 300 MHz band is used for the transmission of the identification code information for the authentication. When the authentication is performed, a distance between the device 1 and the device 2 is measured.

Figure 3:
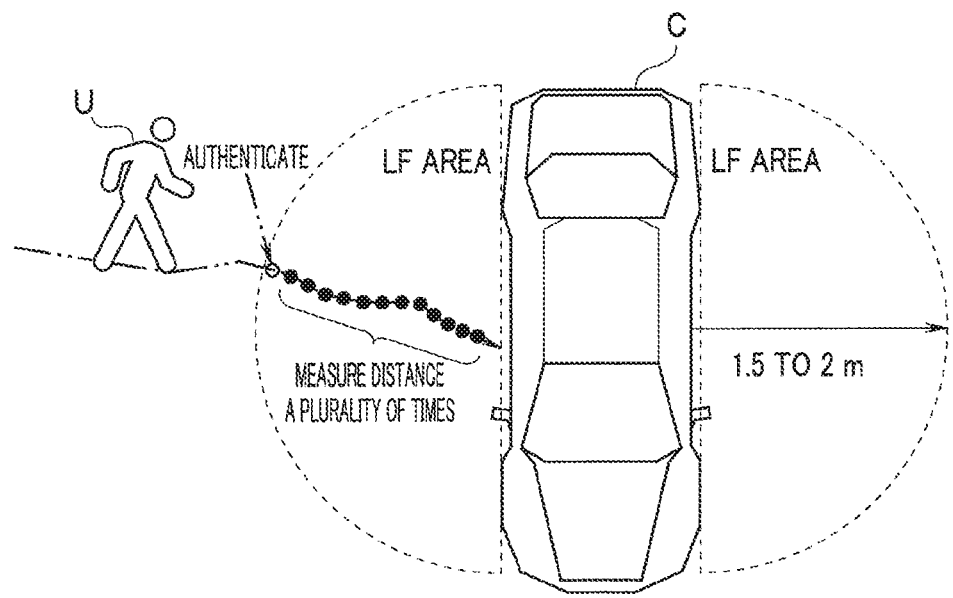
FIG. 3 is a diagram for describing how authentication and distance measurement are performed when a user who holds a key has approached a vicinity of an automobile according to the embodiment.

FIG. 3 is a diagram for describing how authentication and distance measurement are performed when a user U who holds the key K has been approaching a vicinity of the automobile C. In FIG. 3, a range indicated by a dotted line represents an LF area. The LF area is a range that the beacon signal reaches and an area within 1.5 to 2 m from a center of a side surface of the automobile C, for example. When the device 2 held by the user U enters the LF area, two or more distance measurement signals as carrier signals are transmitted and received a plurality of times between the device 1 and the device 2 and distance measurement is performed a plurality of times after authentication. Each of the carrier signals is an unmodulated continuous wave (CW). The distance measurement may be performed once, although performed a plurality of times. The distance measurement signal is a carrier signal in a sub-gigahertz band, e.g., a 920 MHz band.

Figure 4:
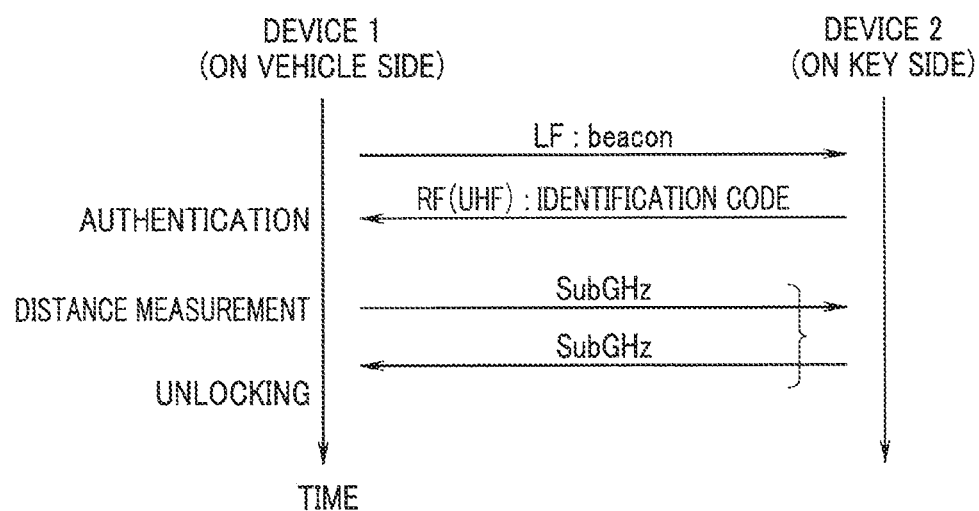
FIG. 4 is a diagram illustrating a transmission/receiving sequence of a wireless signal performed between a device in the automobile and a device in the key according to the embodiment.

FIG. 4 is a diagram illustrating a transmission/receiving sequence of a wireless signal performed between the device 1 in the automobile C and the device 2 in the key K.

The device 1 always transmits a beacon signal from an LF transmission unit 12. Since the beacon signal is a signal that reaches only an LF area, an LF receiving unit 22 in the device 2 can receive the beacon signal only when the device 2 is within the LF area.

The device 2, in response to the receiving of the beacon signal, enters a predetermined standby state at the same time that the device 2 transmits identification code information from an RF (radio frequency) transmission unit 23 When an RF receiving unit 13 in the device 1 receives the identification code information, a processor 11 performs authentication based on the received identification code information. The processor 11 transmits a distance measurement signal when the processor 11 can correctly perform authentication based on the received identification code information. Then, a distance measurement signal is also transmitted from the device 2 so that a distance between the device 1 and the device 2 is measured.

The distance between the device 1 and the device 2 is measured using a method as disclosed in Japanese Patent Application Laid-Open Publication No. 2018-155724. The distance between the device 1 and the device 2 is calculated based on respective phases of carrier signals calculated in each of the device 1 and the device 2. According to the method disclosed in Japanese Patent Application Laid-Open Publication No. 2018-155724, a device 1 transmits two or more (here, two) carrier signals as first distance measurement signals, and a device 2 transmits two or more (here, two) carrier signals as second distance measurement signals. The device 2 detects a phase difference between the received two carrier signals as the first distance measurement signals, and the device 1 detects a phase difference between the received two carrier signals as the second distance measurement signals. Information about the phase difference detected in the device 2, i.e., phase difference information is transmitted to the device 1, and the device 1 calculates the distance between the device 1 and the device 2 from the phase difference detected by the device 1 and phase difference information received from the device 2 using a predetermined operation.

Note that in the present embodiment, the device 2 may transmit information about each of respective phases of received two carrier signals to the device 1, and the device 1 may calculate a phase difference from information about the two phases received from the device 2.

The device 1 can judge presence or absence of a relay attack based on a calculated distance (hereinafter referred to as a measured distance) Rm between the device 1 and the device 2. When the measured distance Rm exceeds a predetermined distance, e.g., 2 m, a relay attack may be performed. Accordingly, the processor 11 does not output a signal for permitting the automobile C to unlock a door, for example. When the measured distance Rm is the predetermined distance or less, the key K is within a predetermined distance from the automobile C. Accordingly, the processor 11 outputs a signal for permitting the automobile C to unlock the door. Upon receiving the permission signal, a device configured to control unlocking of the door of the automobile C, for example, outputs a control signal for unlocking the door when a human hand has touched the door.

As illustrated in FIG. 1, the device 1 includes the processor 11, the LF transmission unit 12, the RF receiving unit 13, and a distance measurement unit 14. The device 2 includes a processor 21, the LF receiving unit 22, an RF transmission unit 23, and a distance measurement unit 24.

The processor 11 in the device 1 includes a central processing unit (hereinafter referred to as a CPU), a ROM, a RAM, and the like, and the ROM stores software programs that control respective operations of the LF transmission unit 12, the RF receiving unit 13, and the distance measurement unit 14. The processor 11 further performs a phase difference operation based on second distance measurement signals received in the distance measurement unit 14. Further, the processor 11 calculates a measured distance Rm using a phase difference obtained by the phase difference operation and a difference between two phases included in phase information received from the device 2, and performs a predetermined operation based on the calculated measured distance Rm. The predetermined operation is output of the above-described signal for permitting the unlocking of the door, for example.

The processor 21 in the device 2 includes a CPU, a ROM, a RAM, and the like, and the ROM stores software programs that control respective operations of the LF receiving unit 22, the RF transmission unit 23, and the distance measurement unit 24. The processor 21 further detects, i.e., measures phases based on distance measurement signals received in the distance measurement unit 24, and transmits phase information of the detected phases.

Note that although each of the processors 11 and 21 is configured to include the CPU, the ROM, and the like for executing software programs that respectively implement its functions, the processor may include an electronic circuit such as a semiconductor device or an FPGA (field programmable gate array) and implement the functions using the circuit or the like.

As described above, the distance measurement signals respectively include two or more (here, two) carrier signals having different frequencies. As disclosed in Japanese Patent Application Laid-Open Publication No. 2018-155724, a distance R between the device 1 and the device 2 is determined as a measured distance Rm based on a sum of the phase difference between the carrier signals respectively having the two frequencies as the first distance measurement signals and the phase difference between the carrier signals respectively having the two frequencies as the second distance measurement signals. However, if the sum of the two phase differences exceeds 360 degrees, a plurality of candidates for the measured distance Rm exist so that distance measurement cannot be performed.

In the present embodiment, vernier distance measurement using distance measurement signals respectively having three frequencies is also performed to extend the measured distance Rm.

Figure 5:
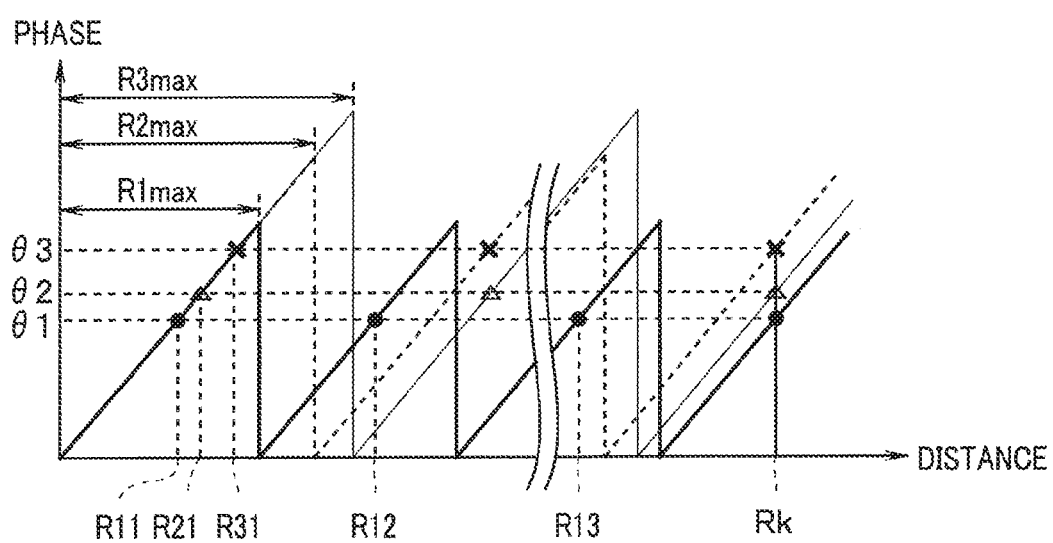
FIG. 5 is a diagram for describing a method of judging a distance based on information about a sum of phase differences when distance measurement signals respectively having three frequencies are used according to the embodiment.

FIG. 5 is a diagram for describing a method of judging a distance based on information about a sum of phase differences when distance measurement signals respectively having three frequencies are used.

In FIG. 5, a vertical axis and a horizontal axis respectively indicate a sum (phase) of phase differences respectively detected in the devices 1 and 2 and a measured distance Rm (meter). A thick solid line is a graph illustrating a relationship between a sum (phase) of respective phase differences by a first carrier signal and a second carrier signal and the measured distance Rm. A dotted line is a graph illustrating a relationship between a sum (phase) of respective phase differences by the second carrier signal and a third carrier signal and the measured distance Rm. A thin solid line is a graph illustrating a relationship between a sum (phase) of respective phase differences by the first carrier signal and the third carrier signal and the measured distance Rm.

For the phases (for the sums of phase differences), there respectively exist maximum measured distances R1max, R2max, and R3max that can be measured when the sum of the two phase differences is within 360 degrees. When the measurement distance Rm exceeds each of the maximum measured distances, there exist a plurality of distance candidates. However, when a least common multiple of the maximum measured distances R1max, R2max, and R3max that can be respectively calculated by the phases is set to a maximum measurable distance Rmax, the measured distance Rm can be extended by setting a distance where measured distances match each other among each plurality of distance candidates that can be calculated from each of the three phases, among all the distance candidates within the maximum measurable distance Rmax, to the measured distance Rm.

In FIG. 5, when the sum (phase) of the respective phase differences by the first carrier signal and the second carrier signal is θ1, the sum (phase) of the respective phase differences by the second carrier signal and the third carrier signal is θ2, and the sum (phase) of the respective phase differences by the first carrier signal and the third carrier signal is θ3, distances, which match one another, among respective pluralities of distances to be calculated from the three phases are a distance Rk.

As indicated by a black circle, distances R11, R12, R13, . . . , Rk can also be one distance to be calculated for the phase θ1. A plurality of triangular marks each indicate a distance to be calculated for the phase θ2. An x mark indicates a distance to be calculated for the phase θ3. Distances, which match one another, among respective plurality of distances to be calculated for the phases θ1, θ2, and θ3 are only a distance Rk.

For each of the phases (the sums of phase differences), R11, R21, and R31 respectively exist to correspond to the calculated phases (sums of phase differences) θ1, θ2, and θ3 when the sum of the two phase differences is within 360 degrees. A least common multiple of (R11+R1max), (R21+R2max), and (R31+R3max) is the distance Rk.

Accordingly, when the calculated phases (sums of phase differences) are respectively θ1, θ2, and θ3, even if there are a plurality of distances corresponding to each of the phases, distances, which match one another, to be respectively estimated by the three phases are a correct measured distance Rm.

Note that although three different frequencies are used at this time, when a frequency of the first carrier signal, a frequency of the second carrier signal, and a frequency of the third carrier signal are respectively f1, f2, and f3, and f2 is an average value of f1 and f3, i.e., f2=(f1+f3)/2, (f2−f1)= (f3−f2). Therefore, only two graphs are drawn in FIG. 5. Accordingly, a maximum measurable distance Rmax becomes short. To increase the maximum measurable distance Rmax, the frequency f2 is set to a value that deviates from (f1+f3)/2 so that three graphs are drawn.

On the other hand, to enhance a distance measurement accuracy, a multi-path effect needs to be eliminated. Therefore, the multi-path effect can be eliminated based on receiving of three or more carrier signals. For example, according to a method disclosed in Japanese Patent Application Laid-Open Publication No. 2018-155725, a technique for adding a third carrier signal to first and second carrier signals to eliminate a multi-path effect has been proposed.

According to a method related to the proposal, when respective frequencies of the first carrier signal, the second carrier signal, and the third carrier signal are f1, f2, and f3, approximately (f1+f3)/2 is used as f2.

Figure 6:
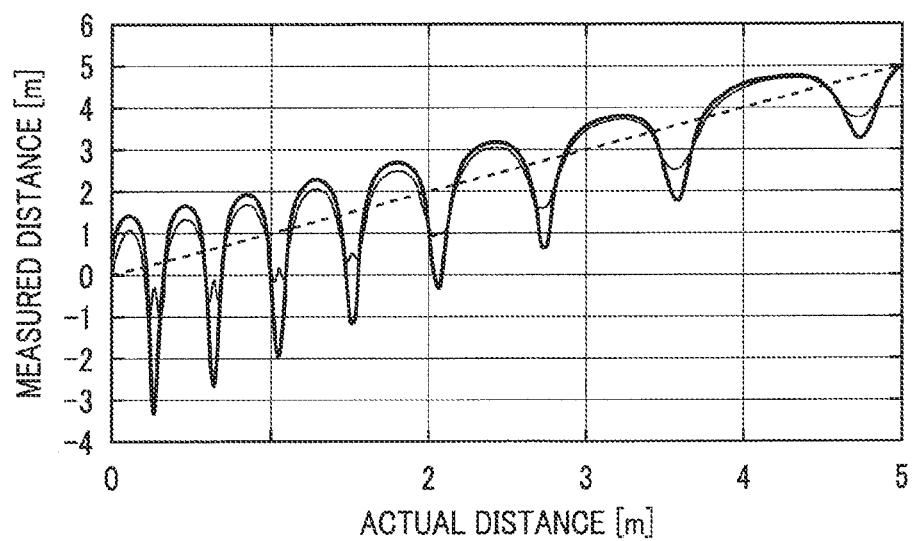
FIG. 6 is a graph illustrating an example of a relationship between an actual distance and a measured distance when a multi-path effect has been eliminated based on respective receiving powers of three carrier signals according to the embodiment.

FIG. 6 is a graph illustrating an example of a relationship between an actual distance and a measured distance in a case where a multi-path effect has been eliminated based on respective receiving powers of three carrier signals. In FIG. 6, a horizontal axis and a vertical axis respectively indicate an actual distance Rr(m) between the device 1 and the device 2 and a measured distance Rm (m) calculated using the above-described method. If there is no multi-path, the measured distance Rm obtained using the above-described three carrier signals matches the actual distance Rr, as indicated by a dotted line.

However, the measured distance Rm may not match the actual distance Rr due to the multi-path effect, as indicated by a thick solid line. When the method disclosed in Japanese Patent Application Laid-Open Publication No. 2018-155725 is used, fading correction can be performed from the respective receiving powers of the carrier signals. In the method disclosed in Japanese Patent Application Laid-Open Publication No. 2018-155725, a fading correction value is calculated from the receiving power, and a measured distance is corrected using the fading correction value.

In FIG. 6, the thick solid line is a graph illustrating a relationship between the actual distance Rr and the measured distance Rm when fading correction is not performed. A thin solid line is a graph illustrating a relationship between the actual distance Rr and the measured distance Rm when fading correction has been performed. When fading correction is performed, the measured distance Rm is closer to the actual distance Rr indicated by the dotted line than when fading correction is not performed.

When fading correction is performed based on receiving powers, respective frequencies of the three carrier signals need to satisfy approximately f2=(f1+f3)/2. If the one frequency f2 among the three frequencies deviates from (f1+f3)/2, fading correction cannot be performed.

Figure 7:
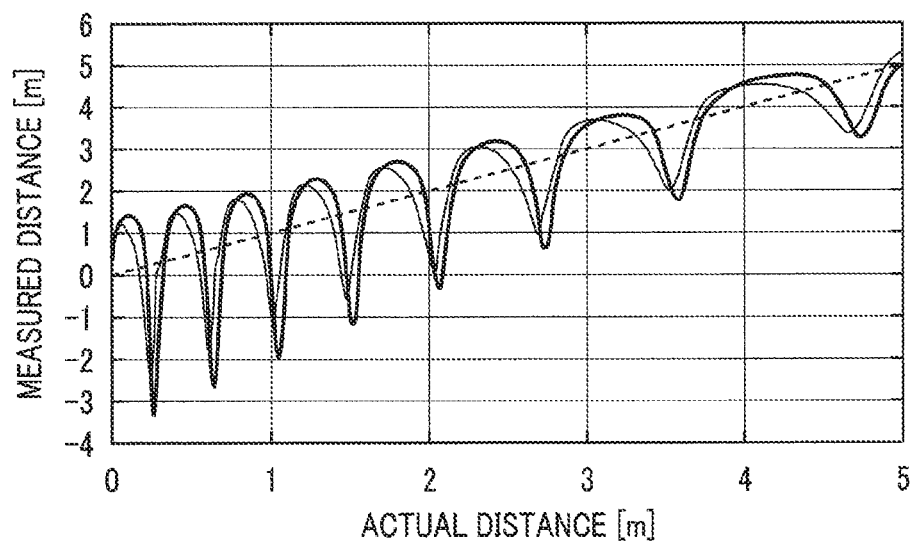
FIG. 7 is a graph illustrating a relationship between an actual distance and a measured distance when a multi-path effect has been eliminated based on a receiving power when a frequency f2 is not (f1+f3)/2 according to the embodiment.

FIG. 7 is a graph illustrating a relationship between an actual distance Rr and a measured distance Rm in a case where a multi-path effect has been eliminated based on receiving powers when the frequency f2 is not (f1+f3)/2. A thin line illustrated in FIG. 7 is a graph in a case where f2 deviates by 6% from (f1+f3)/2. As illustrated in FIG. 7, when the one frequency f2 among the three frequencies deviates from (f1+f3)/2, fading correction cannot be performed.

To extend the measured distance Rm, if the three carrier signals respectively having different frequencies f1, 2, and f3 are used, as described above, the frequency f2 needs to be set not to match (f1+f3)/2. However, the frequency f2 needs to be set to match (f1+f3)/2 to perform fading correction. As a result, four distance measurement signals respectively having different frequencies need to be used to simultaneously extending the measured distance Rm and enabling fading correction for eliminating a multi-path effect.

For example, four carrier signals, i.e., a first carrier signal having a frequency f1, a second carrier signal having a frequency f2 (=(f1+f3)/2), a third carrier signal having a frequency 3, and a fourth carrier signal having a frequency f4 (a frequency that deviates from f2) need to be transmitted and received between the device 1 and the device 2.

However, distance measurement is performed after authentication has been performed between the automobile C and the key K, as illustrated in FIG. 3. Accordingly, the smaller number of times of transmission/receiving of the carrier signals is preferable to shorten a distance measurement time period and is also preferable from the viewpoint of power consumption of the key K to be driven by a battery.

In the present embodiment, not four but three carrier signals are used to simultaneously extend the measured distance Rm and enable fading correction for eliminating a multi-path effect.

In the present embodiment, the respective three carrier signals as the first to third distance measurement signals are transmitted and received between the device 1 and the device 2. The device 1 transmits the respective three carrier signals as the first to third distance measurement signals as a first carrier signal to the device 2, and the device 2 transmits the respective three carrier signals as the first to third distance measurement signals as a second carrier signal to the device 1. When the respective frequencies of the first, second, and third carrier signals are respectively f1, f2, and f3, f2 is a frequency that does not match (f1+f3)/2 and deviates from (f1+f3)/2. A receiving power of fc (=(f1+f3)/ 2) is estimated from respective receiving powers of the three carrier signals, and fading correction is performed using the estimated receiving power.

Figure 8:
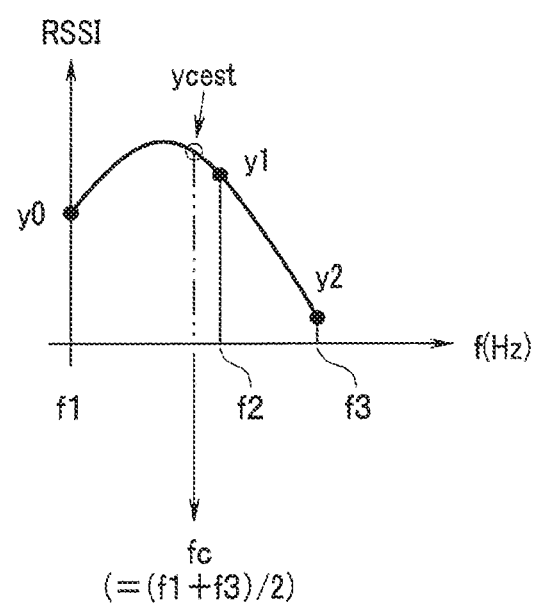
FIG. 8 is a diagram for describing estimation of a receiving signal intensity according to the embodiment.

FIG. 8 is a diagram for describing estimation of a receiving signal intensity. In FIG. 8, a horizontal axis and a vertical axis respectively indicate a frequency (f) and a receiving signal intensity (RSSI).

Respective receiving signal intensities y0, y1, and y2 of three carrier signals having frequencies f1, f2, and f3 are measured. In FIG. 8, the measured three receiving signal intensities are respectively indicated by y0, y1, and y2. The frequency f2 is a frequency that deviates from a frequency fc (=(f1+f3)/2).

A receiving signal intensity of a frequency fc is not measured, and is thus estimated by a quadratic polynomial approximation operation from the measured receiving signal intensities y0, y1, and y2. A receiving signal intensity of a distance measurement signal having the frequency fc is estimated, and is indicated by ycest in FIG. 8.

Accordingly, a transmission/receiving sequence of the three carrier signals respectively having the frequencies f1, f2 and f3 can simultaneously extend a measured distance Rm and enable fading correction for eliminating a multi-path effect.

Figure 9:
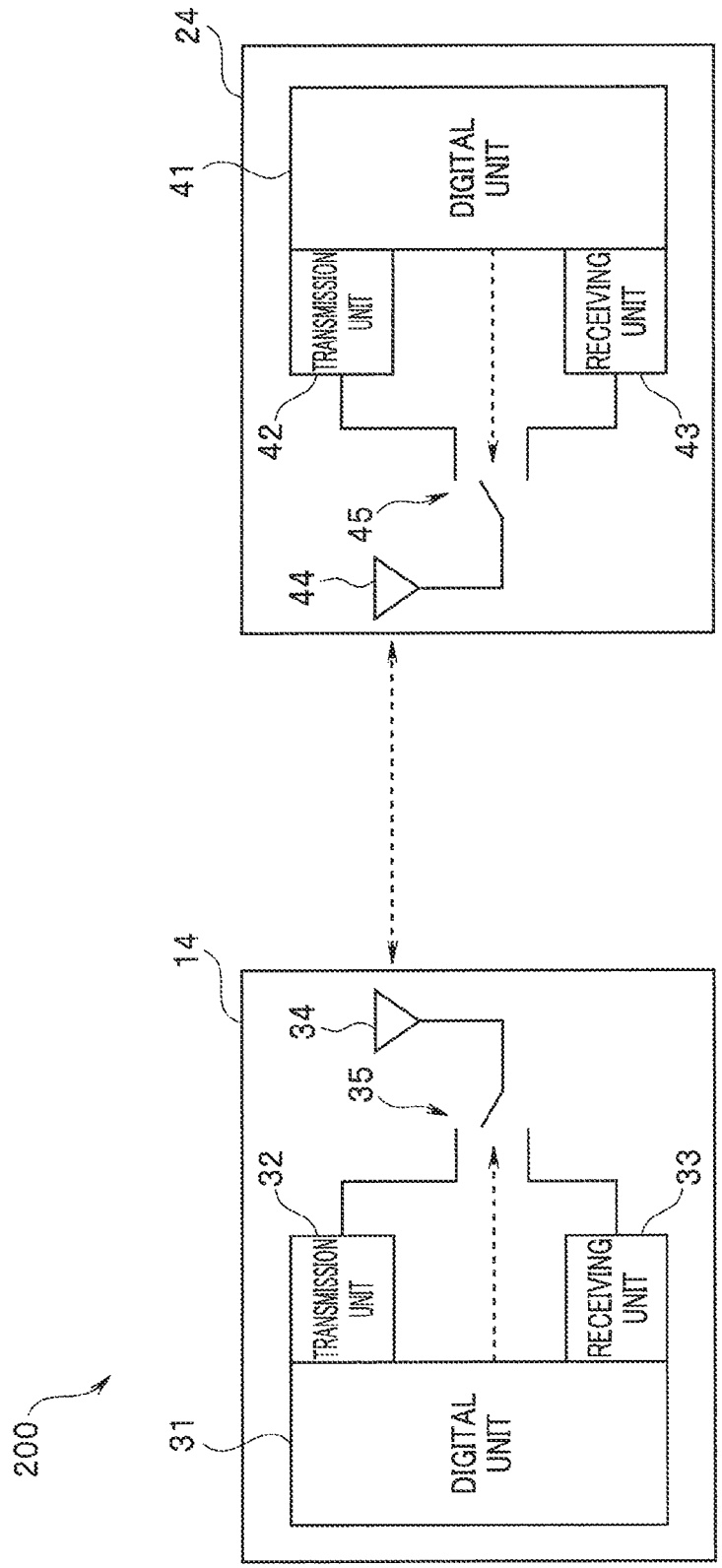
FIG. 9 is a configuration diagram of a distance measurement apparatus according to the embodiment.

FIG. 9 is a configuration diagram of a distance measurement apparatus according to the embodiment. A distance measurement apparatus 200 is configured to include the distance measurement units 14 and 24, and calculates a distance between the device 1 and the device 2 based on carrier phase detection. At least one of the device 1 and the device 2 is movable. The distance measurement unit 14 is included in the device 1, and includes a digital unit 31, a transmission unit 32, a receiving unit 33, an antenna 34, and an antenna switch 35. The digital unit 31, the transmission unit 32, the receiving unit 33, and the antenna switch 35 are configured as one or two or more semiconductor devices. The distance measurement unit 24 is included in the device 2, and includes a digital unit 41, a transmission unit 42, a receiving unit 43, an antenna 44, and an antenna switch 45. The digital unit 41, the transmission unit 42, the receiving unit 43, and the antenna switch 45 are configured as one or two or more semiconductor devices.

The digital unit 31 in the device 1 controls the transmission unit 32, the receiving unit 33, and the antenna switch 35 in response to a control signal from the processor 11. The digital unit 41 in the device 2 controls the transmission unit 42, the receiving unit 43, and the antenna switch 45 in response to a control signal from the processor 21.

Figure 10:
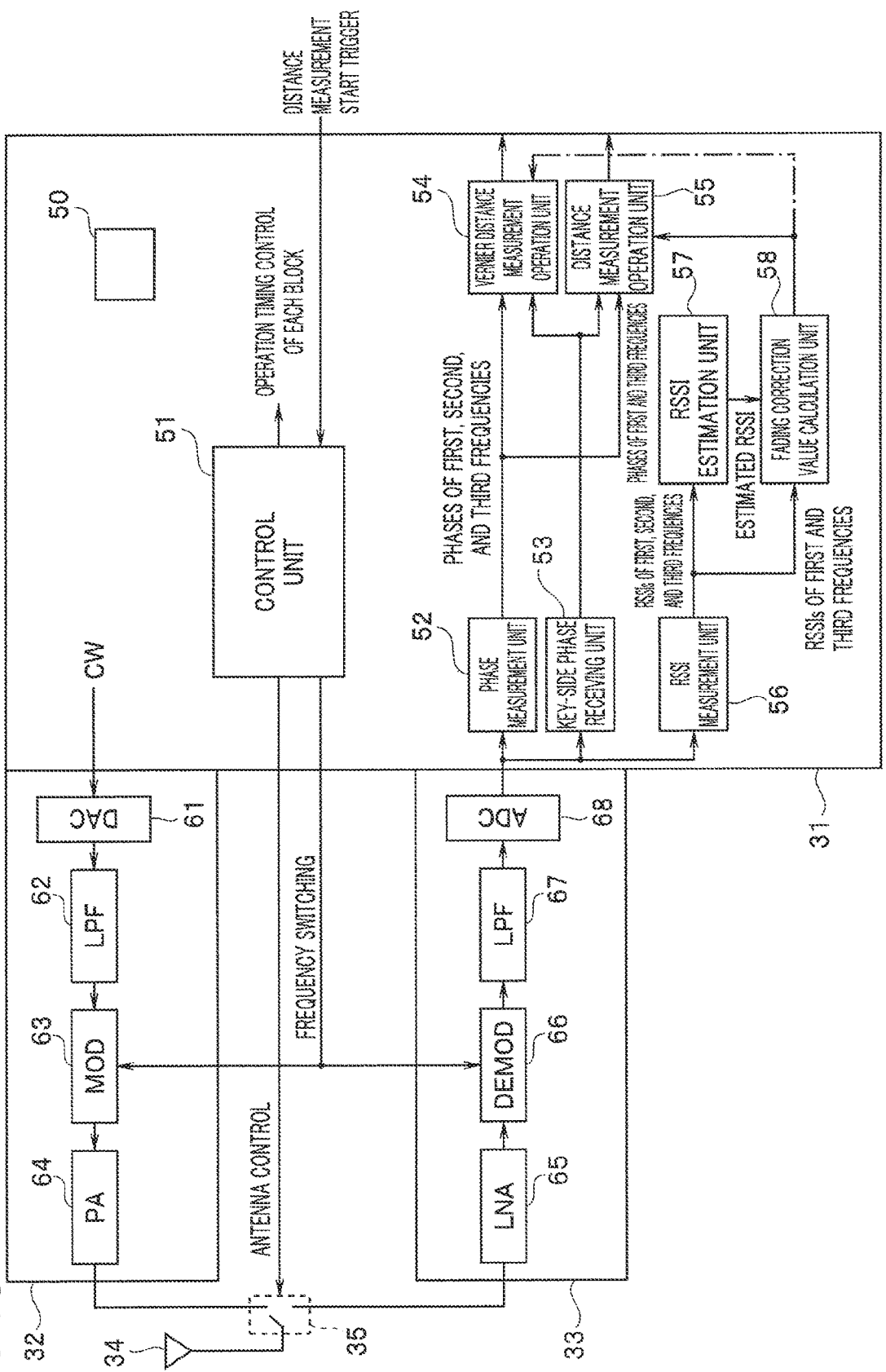
FIG. 10 is a circuit diagram of a distance measurement unit in one of the two devices according to the embodiment.

FIG. 10 is a circuit diagram of the distance measurement unit 14 in the device 1. The digital unit 31 is composed of a digital circuit on the semiconductor device, for example. The digital unit 31 includes a reference oscillator 50, a control unit 51, a phase measurement unit 52, a key-side phase receiving unit 53, a vernier distance measurement operation unit 54, a distance measurement operation unit 55, an RSSI measurement unit 56, an RSSI estimation unit 57, and a fading correction value calculation unit 58.

The reference oscillator 50 is a reference signal source configured to generate a basic clock signal of an operation within the distance measurement unit 14. Upon receiving a command signal (hereinafter referred to as a distance measurement start trigger signal) as a distance measurement start trigger from the processor 11, the control unit 51 controls an operation timing of each of blocks such as the phase measurement unit 52 to perform an operation of a predetermined distance measurement sequence.

The phase measurement unit 52 measures a phase of each of carrier signals from the device 2. The phase measurement unit 52 is a circuit configured to measure respective phases of three carrier signals from the device 2 that have been received in the receiving unit 33. In other words, the phase measurement unit 52 measures the phase of each of the received three second carrier signals.

The key-side phase receiving unit 53 is a circuit configured to receive phase information and receiving signal intensity (RSSI) information of the three carrier signals, which have been measured in the device 2, received from the device 2.

The vernier distance measurement operation unit 54 calculates a distance between the device 1 and the device 2 from respective phases of three carrier signals having frequencies f1, 2, and f3 received by the device 1 and the phase information (the respective phases of the three carrier signals having the frequencies f1, f2, and f3) received from the device 2. Accordingly, the vernier distance measurement operation unit 54 constitutes a calculation unit configured to calculate the distance between the device 1 and the device 2 based on the phase information respectively acquired in the device 1 and the device 2. Particularly, the vernier distance measurement operation unit 54 calculates the distance using information about the phase of each of the three second carrier signals measured in the phase measurement unit 52 and information about a phase of each of three first carrier signals measured in a phase measurement unit 72, respectively, as phase information. The vernier distance measurement operation unit 54 corrects the calculated distance using a fading correction value from the fading correction value calculation unit 58, described below, and outputs the corrected distance to the processor 11.

The distance measurement operation unit 55 calculates a distance between the device 1 and the device 2 from respective phases of the two carrier signals having the frequencies f1 and f3 received by the device 1 and the phase information (the respective phases of the two carrier signals having the frequencies f1 and f3) received from the device 2. Accordingly, the distance measurement operation unit 55 constitutes a calculation unit configured to calculate the distance between the device 1 and the device 2 based on the phase information respectively acquired in the device 1 and the device 2. Particularly, the distance measurement operation unit 55 calculates the distance using information about the phase of each of the carrier signal having the lowest frequency f1 and the carrier signal having the highest frequency S that have been measured in the phase measurement unit 52 and information about a phase of each of a carrier signal having a lowest frequency f1 and a carrier signal having a highest frequency S that have been measured in the phase measurement unit 72, respectively, as phase information. The distance measurement operation unit 55 also corrects the calculated distance using the fading correction value from the fading correction value calculation unit 58, described below, and outputs the corrected distance to the processor 11.

The vernier distance measurement operation unit 54 uses the three carrier signals respectively having the different frequencies f1, 2, and f3 to measure a distance farther than a maximum measured distance of the distance measurement operation unit 55. Particularly, the frequency f2 is a frequency that deviates from (f1+f3)/2.

The distance measurement operation unit 55 performs distance measurement using a phase difference between the two carrier signals respectively having the frequencies f1 and f3. In other words, the distance measurement operation unit 55 calculates a distance using a phase difference between the two carrier signals respectively having the frequencies f1 and f3 received by the distance measurement unit 14 and a phase difference between the two carrier signals respectively having the frequencies f1 and f3 received by the distance measurement unit 24.

The vernier distance measurement operation unit 54 and the distance measurement operation unit 55 correct calculated distance information using a correction value from the fading correction calculation unit 58.

Accordingly, the vernier distance measurement operation unit 54 and the distance measurement operation unit 55 constitute a calculation unit configured to calculate a distance using a phase detection result obtained by receiving the three first carrier signals and the three second carrier signals while correcting the calculated distance using the fading correction value.

Therefore, information about the respective three phases of the three carrier signals having the frequencies f1, f2, and f3 obtained by the phase measurement unit 52 are fed to the vernier distance measurement operation unit 54, and information about the two phases of the respective two carrier signals having the frequencies f1 and f3 obtained by the phase measurement unit 52 are fed to the distance measurement operation unit 55.

Note that the distance measurement unit 14 in the device 1 includes the vernier distance measurement operation unit 54 and the distance measurement operation unit 55 to enable distance information calculated by the vernier distance measurement operation unit 54 and distance information calculated by the distance measurement operation unit 55 to be differently used, for example, to enable the distance information calculated by the distance measurement operation unit 55 and the distance information calculated by the vernier distance measurement operation unit 54 to be differently used, respectively, when the calculated distance is short and when the calculated distance is long.

The RSSI distance measurement unit 56 measures, from the receiving powers of the received three carrier signals, respectively, receiving signal intensities (RSSI) of the carrier signals while also storing information about the receiving signal intensities (RSSI) of the three carrier signals measured by the device 2. Accordingly, the RSSI distance measurement unit 56 constitutes a receiving signal intensity measurement unit configured to measure the respective receiving signal intensities of the three second carrier signals from the device 2.

The RSSI estimation unit 57 calculates and estimates the receiving power of the frequency fc (=(f1+f3)/2) intermediate between f1 and f3 using the respective receiving powers of the three carrier signals measured by each of the device 1 and the device 2, as described above. In other words, the RSSI estimation unit 57 estimates, from the respective three receiving signal intensities of the three first carrier signals and the respective three receiving signal intensities of the three second carrier signals received from the device 2, the respective receiving signal intensities of the frequencies fc having average values.

More specifically, the RSSI estimation unit 57 uses the respective receiving signal intensities based on the receiving powers of the three carrier signals received and measured by the device 1 and the respective receiving signal intensities based on the receiving powers of the three carrier signals measured by the device 2, to calculate an average value for each of the frequencies. The RSSI estimation unit 57 estimates the receiving signal intensity of the carrier signal having the frequency fc, as described above, from a quadratic function found from the three receiving signal intensities, as described above.

Note that although the RSSI estimation unit 57 uses the respective receiving signal intensities of the three carrier signals received and measured by the device 1 and the respective receiving signal intensities of the three carrier signals measured by the device 2, the RSSI estimation unit 57 may estimate the receiving signal intensity of the carrier signal having the frequency fc from only the respective receiving signal intensities of the three carrier signals received and measured by the device 1 or the device 2. Accordingly, the RSSI estimation unit 57 constitutes an estimation unit configured to estimate, from at least one of the respective three receiving signal intensities of the three first carrier signals and the respective three receiving signal intensities of the three second carrier signals, the receiving signal intensity of the frequency having the above-described average value.

The fading correction value calculation unit 58 calculates a correction value for fading correction using the estimated receiving signal intensity of the frequency fc and the respective receiving signal intensities of the frequencies f1 and f3, and feeds the calculated correction value to the distance measurement operation unit 55 and the vernier distance measurement operation unit 54. Accordingly, the fading correction value calculation unit 58 calculates a fading correction value corresponding to a distance from the receiving signal intensity of the frequency fc having the average value, the receiving signal intensify f1 of the lowest frequency, and the receiving signal intensity of the highest frequency 3.

Note that the correction value for fading correction may be fed to only the distance measurement operation unit 55 without being fed to the vernier distance measurement operation unit 54, as indicated by a one-dot and dash line.

Then, the transmission unit 32 will be described. The digital unit 31 generates data of an unmodulated signal (CW) based on the reference oscillator 50, and outputs the generated data to the transmission unit 32.

The transmission unit 32 is an analog circuit including a digital/analog converter (hereinafter abbreviated as a DAC) 61, a low-pass filter (hereinafter abbreviated as an LPF) 62, a modulator (MOD) 63, and an amplifier 64.

The DAC 61 receives digital data for a continuous wave (CW) from the digital unit 31, and converts the received digital data into an analog signal. Accordingly, the digital unit 31 generates the digital data for the continuous wave (CW).

The analog signal from the DAC 61 is inputted to the modulator 63 after passing through the LPF 62. The modulator 63 frequency-modulates an output signal of the LPF 62 in response to a frequency switching signal from the control unit 51. The analog signal from the LPF 62 is modulated into any one of the above-described frequencies f1, f3, and f4.

The modulator 63 modulates an input signal in response to the frequency switching signal from the control unit 51, and generates a signal having any one of the frequencies f1, f2, and f3.

The amplifier 64 is a power amplifier, and amplifies an output signal of the modulator 63 and feeds the amplified output signal to the antenna 34 via the antenna switch 35. The antenna switch 35 operates to connect the antenna 34 to the transmission unit 32 or the receiving unit 33 in response to an antenna control signal from the control unit 51.

Then, the receiving unit 33 will be described. The receiving unit 33 is an analog circuit including a low-noise amplifier (hereinafter abbreviated as an LNA) 65, a demodulator (DEMOD) 66, an LPF 67, and an analog-to-digital converter (hereinafter abbreviated as an ADC) 68.

The LNA 65 amplifies a receiving signal from the antenna 34 received via the antenna switch 35, and outputs the amplified receiving signal to the demodulator 66. The demodulator 66 demodulates an output signal of the LNA 65 and outputs a baseband signal in response to the frequency switching signal from the control unit 51.

An output signal of the demodulator 66 is fed to the ADC 68 via the LPF 67. The ADC 68 converts an output signal of the LPF 67 into a digital signal, and outputs the digital signal to the digital unit 31.

As described above, the transmission unit 32 and the receiving unit 33 constitute a first transmitter/receiver configured to transmit the three first carrier signals respectively having the different frequencies (f1, f2, and f3) while receiving the three second carrier signals respectively having the same frequencies as the frequencies of the three first carrier signals using an output of the reference oscillator 50, the frequency between the lowest frequency and the highest frequency among the three frequencies being a frequency that deviates from the average value of the lowest frequency and the highest frequency.

Figure 11:
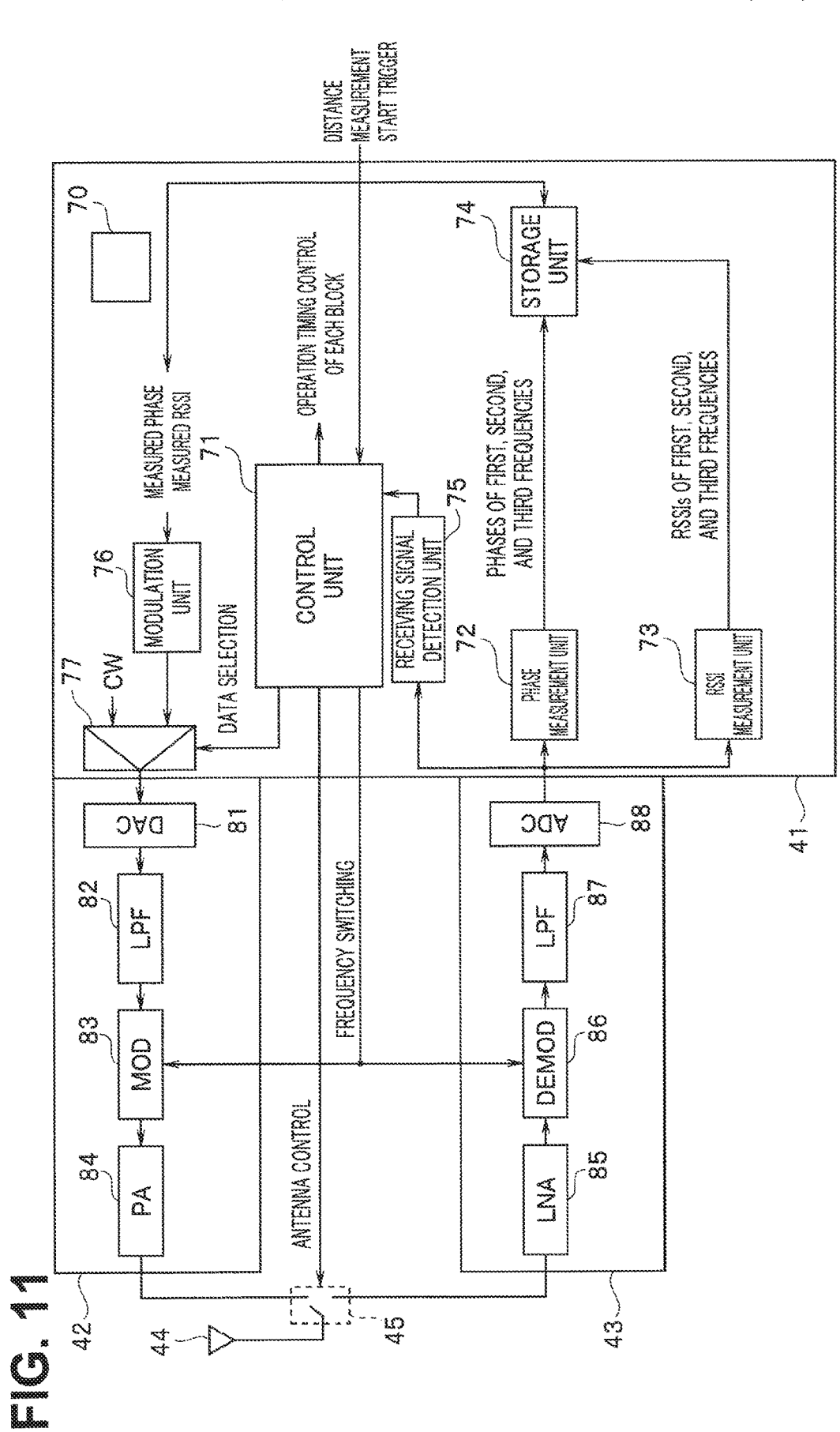
FIG. 11 is a circuit diagram of a distance measurement unit in the other of the two devices according to the embodiment.

FIG. 11 is a circuit diagram of the distance measurement unit 24 in the device 2. The digital unit 41 is composed of a digital circuit on the semiconductor device, for example. The digital unit 41 includes a reference oscillator 70, a control unit 71, a phase measurement unit 72, an RSSI measurement unit 73, a storage unit 74, a receiving signal detection unit 75, a modulation unit 76, and a selector 77.

The reference oscillator 70 is a reference signal source configured to generate a basic clock signal of an operation within the distance measurement unit 24. The reference oscillator 70 operates independently of the reference oscillator 50 in the device 1. Upon receiving a distance measurement start trigger signal from the processor 21, the control unit 71 controls an operation timing of each of blocks such as the phase measurement unit 72 to perform an operation of a predetermined distance measurement sequence. The processor 21 transmits identification code information, and then outputs the distance measurement start trigger signal to the control unit 71 in the distance measurement unit 24.

The phase measurement unit 72 measures a phase of each of carrier signals from the device 1. Information about the measured phase of each of the carrier signals is stored in the storage unit 74. In other words, the phase measurement unit 72 measures the phase of each of the received three first carrier signals.

The RSSI measurement unit 73 measures, from the receiving powers of the carrier signals having the frequencies f1, f2, and f3, respectively, receiving signal intensities of the carrier signals. Information about the measured receiving signal intensity of each of the carrier signals is stored in the storage unit 74.

The storage unit 74 is a register storing the information about the phase and the receiving signal intensity of each of the carrier signals, as described above.

The receiving signal detection unit 75 detects receiving of the first carrier signal from the device 1. Upon receiving the first carrier signal, the receiving signal detection unit 75 notifies the control unit 71 that the first carrier signal has been received.

The modulation unit 76 modulates the phase information and the receiving signal intensity information, respectively, into signals for transmitting the information. The phase information and the receiving signal intensity information are modulated into IQ signals respectively corresponding to digital data of the information. In other words, the phase information and the receiving signal intensity information, which have been measured in the distance measurement unit 24, are transmitted to the distance measurement unit 14 in the device 1.

The selector 77 selects data of the continuous wave (CW) based on the reference oscillator 70 or an output signal of the modulation unit 76 in response to a data selection signal from the control unit 71, and outputs the data or the output signal to the transmission unit 42.

Upon receiving a distance start trigger signal from the processor 21, the control unit 71 enters a standby state of the carrier signal from the device 1 in the automobile C.

Then, the transmission unit 42 will be described. The transmission unit 42 is an analog circuit including a DAC 81, an LPF 82, a modulator (MOD) 83, and an amplifier 84.

The DAC 81 receives digital data for a continuous wave (CW) from the digital unit 41, and converts the received digital data into an analog signal. Accordingly, the digital unit 81 generates the digital data for the continuous wave (CW).

The analog signal from the DAC 81 is inputted to the modulator 83 after passing through the LPF 82. The modulator 83 frequency-modulates an output signal of the LPF 82 in response to a frequency switching signal from the control unit 71. An analog signal from the LPF 82 is modulated into any one of the above-described frequencies f1, f3, and f4.

The modulator 83 modulates an input signal in response to the frequency switching signal from the control unit 71, and generates a signal having any one of the frequencies f1, f2, and f3.

The amplifier 84 is a power amplifier, and amplifies an output signal of the modulator 83 and feeds the amplified output signal to the antenna 44 via the antenna switch 45. The antenna switch 45 operates to connect the antenna 44 to the transmission unit 42 or the receiving unit 43 in response to an antenna control signal from the control unit 71.

Then, the receiving unit 43 will be described. The receiving unit 43 is an analog circuit including a low-noise amplifier (hereinafter abbreviated as an LNA) 85, a demodulator (DEMOD) 86, an LPF 87, and an analog-to-digital converter (hereinafter abbreviated as an ADC) 88.

The LNA 85 amplifies a receiving signal from the antenna 44 received via the antenna switch 45, and outputs the amplified receiving signal to the demodulator 86. The demodulator 86 demodulates an output signal of the LNA 85 and outputs a baseband signal in response to the frequency switching signal from the control unit 71.

An output signal of the demodulator 86 is fed to the ADC 88 via the LPF 87. The ADC 88 converts an output signal of the LPF 87 into a digital signal, and outputs the digital signal to the digital unit 41.

As described above, the transmission unit 42 and the receiving unit 43 constitute a second transmitter/receiver configured to transmit the three second carrier signals while receiving the three first carrier signals from the device 1 using an output of the reference oscillator 70.

(Function)

A flow of distance measurement processing will be described below.

Figure 12:
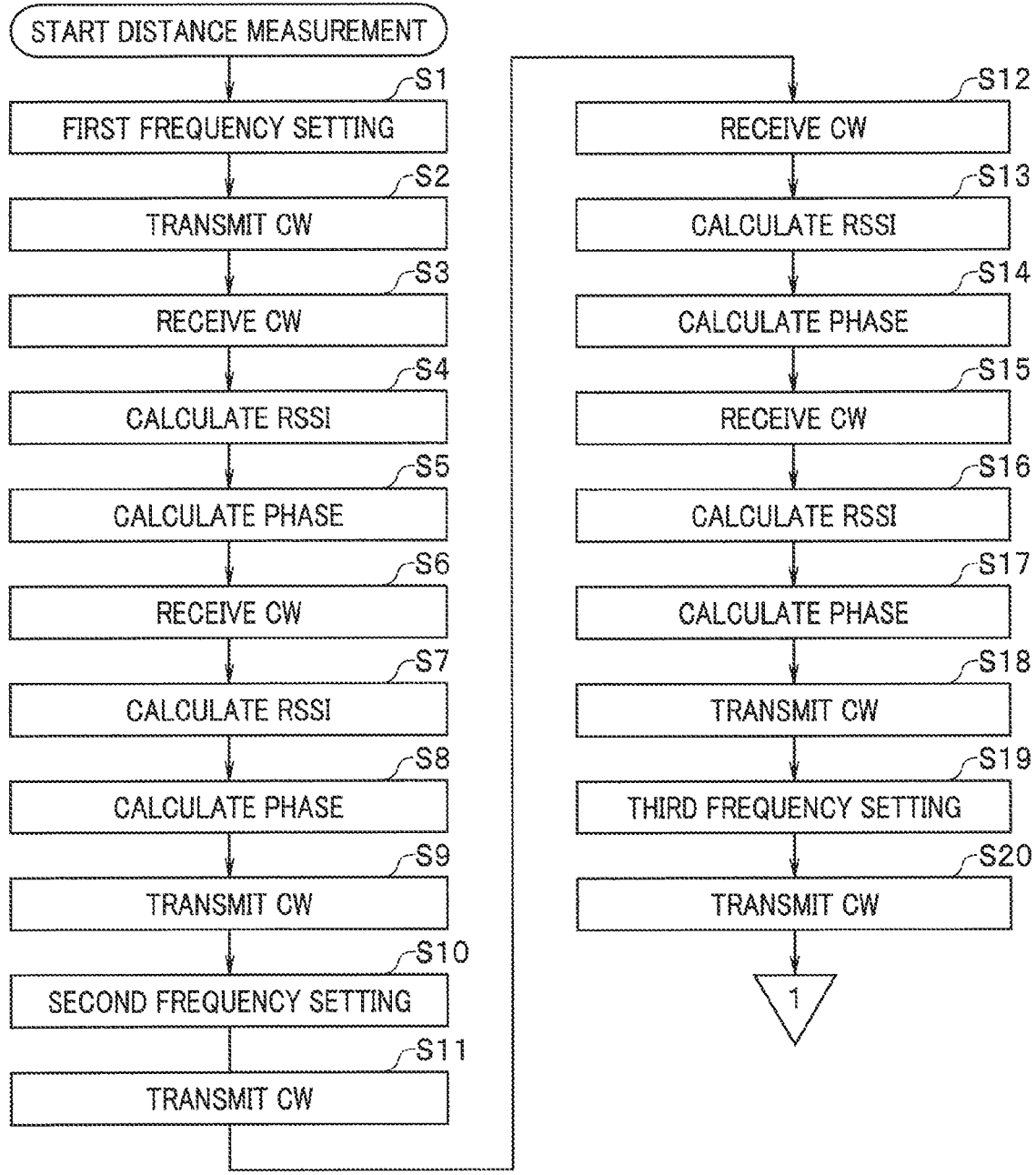
FIG. 12 is a flowchart illustrating an example of a flow of a distance measurement measure in one of the two devices according to the embodiment.
Figure 13:
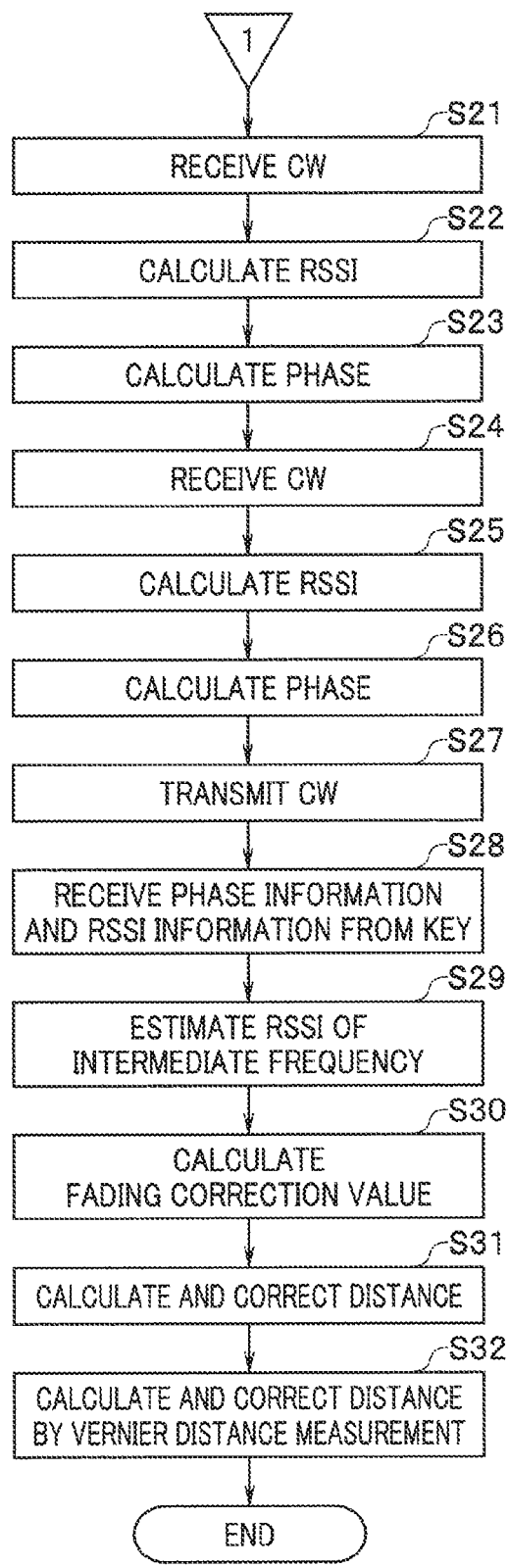
FIG. 13 is a flowchart illustrating the example of the flow of the distance measurement measure in the one of the two devices according to the embodiment.
Figure 14:
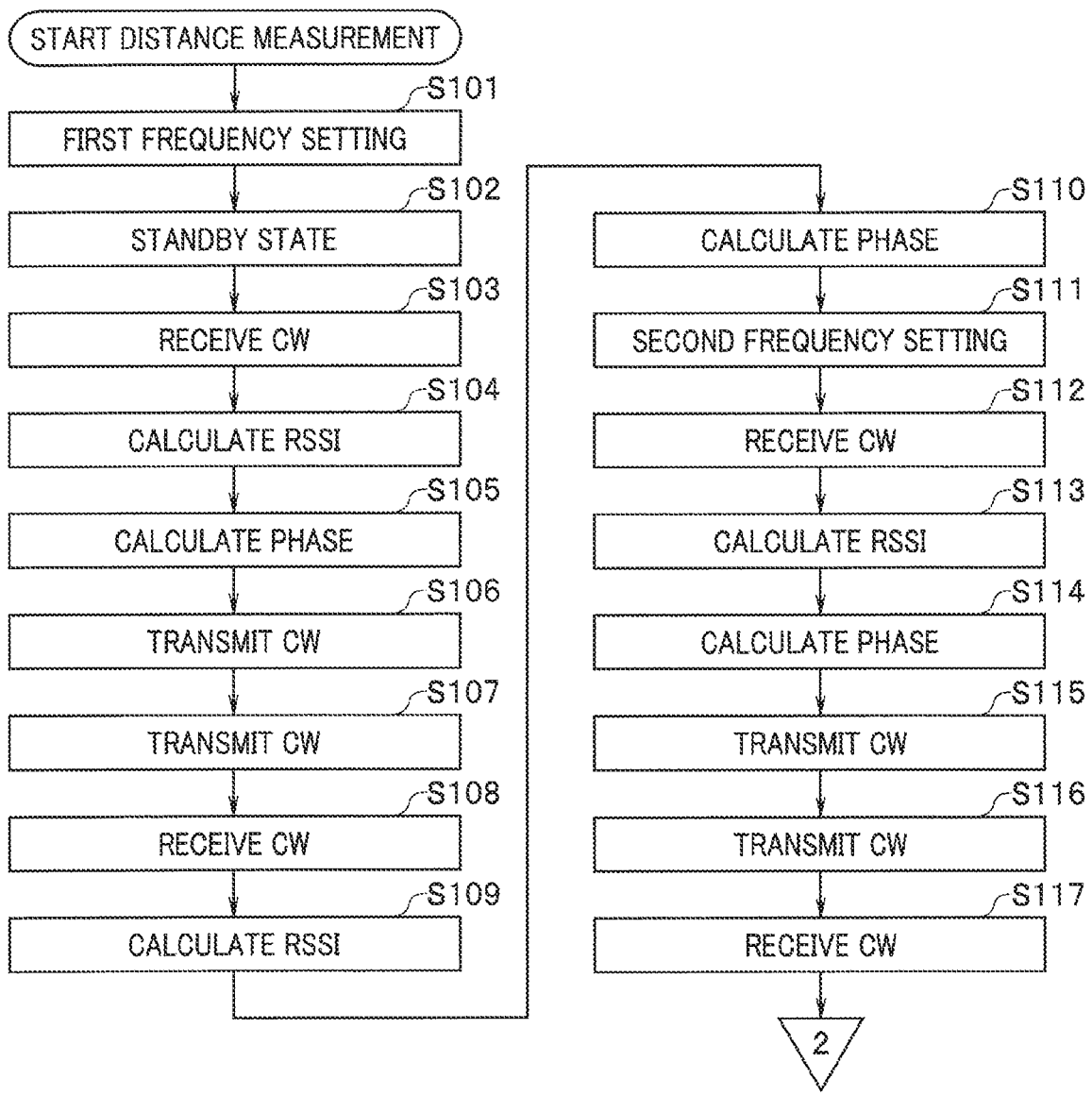
FIG. 14 is a flowchart illustrating an example of a flow of a distance measurement measure in the other of the two devices according to the embodiment.
Figure 15:
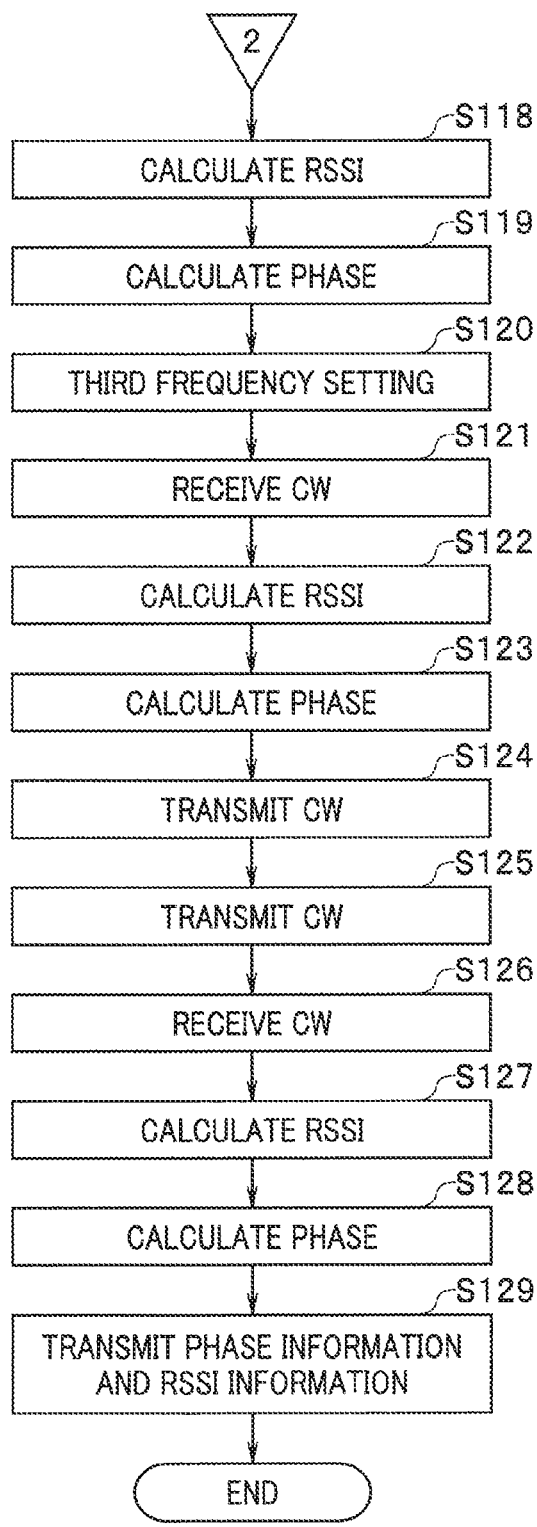
FIG. 15 is a flowchart illustrating the example of the flow of the distance measurement measure in the other of the two devices according to the embodiment.
Figure 16:
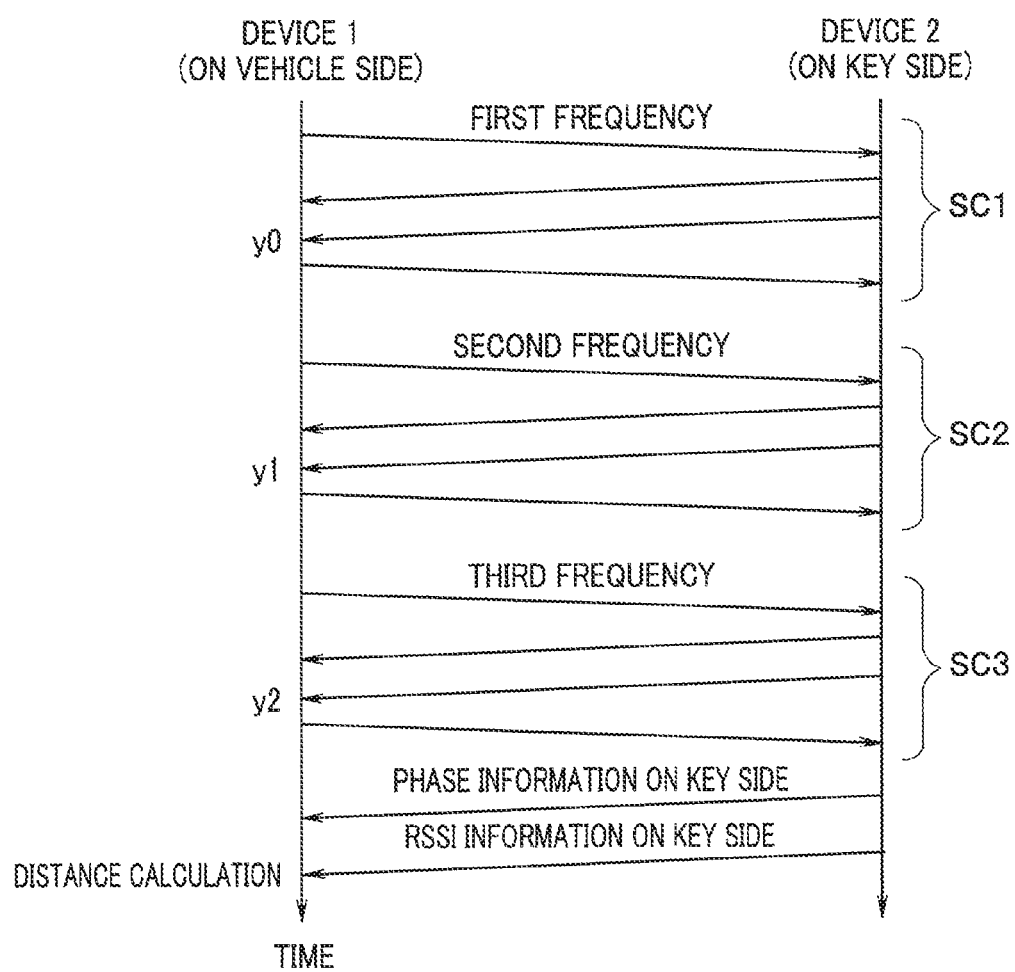
FIG. 16 is a sequence diagram of a plurality of signals to be transmitted and received between the two devices according to the embodiment.

FIGS. 12 and 13 are flowcharts illustrating an example of a flow of a distance measurement measure in the device 1. FIGS. 14 and 15 are flowcharts illustrating an example of a flow of a distance measurement measure in the device 2. FIG. 16 is a sequence diagram of a plurality of signals to be transmitted and received between the device 1 and the device 2.

In the present embodiment, three carrier signals respectively having three frequencies f1, f2, and f3 are used, and a transmission/receiving sequence in which the carrier signal having each of the frequencies reciprocates two times is adopted to eliminate an estimated error and perform accurate distance measurement.

Processing illustrated in FIG. 12 is performed by the control unit 51 when the control unit 51 receives a distance measurement start trigger signal from the processor 11. Processing illustrated in FIG. 14 is performed by the control unit 71 when the control unit 71 receives a distance measurement start trigger signal from the processor 21.

As illustrated in FIG. 12, the control unit 51 performs first frequency setting to transmit and receive the carrier signal having the first frequency f1 from the antenna 34 (step (hereinafter abbreviated as S)1). A process in S1 is performed when the control unit 51 outputs a frequency switching signal to the modulator 63.

After S1, the control unit 51 controls the transmission unit 32, and transmits the carrier signal having the set frequency f1 (S2).

On the other hand, in the device 2, the control unit 71 performs first frequency setting to transmit and receive the carrier signal having the first frequency f1 from the antenna 44 (S101), as illustrated in FIG. 14. A process in S101 is performed when the control unit 71 outputs a frequency switching signal to the modulator 83.

The control unit 71 enters a standby state until the control unit 71 receives a carrier signal from the distance measurement unit 14 in the device 1 (S102). When the distance measurement unit 24 receives the carrier signal from the distance measurement unit 14 in the device 1 (S103), the RSSI measurement unit 73 calculates a receiving signal intensity (RSSI) from a receiving power of the received carrier signal (S104), and the phase measurement unit 72 calculates a phase of the received carrier signal (S105).

After S105, the control unit 71 transmits the carrier signal having the set frequency f1 (S106). After S106, the control unit 71 further transmits the carrier signal having the set frequency f1 (S107).

When the distance measurement unit 14 in the device 1 receives a carrier signal corresponding to S106 of the distance measurement unit 24 in the device 2 (S3), the RSSI measurement unit 56 calculates a receiving signal intensity (RSSI) from a receiving power of the received carrier signal (S4), and the phase measurement unit 52 calculates a phase of the received carrier signal (S5).

Then, the distance measurement unit 14 receives a carrier signal corresponding to S107 of the distance measurement unit 24 in the device 2 (S6), and the control unit 51 calculates a receiving signal intensity (RSSI) from a receiving power of the received carrier signal (S7), and calculates a phase of the received carrier signal (S8).

After S8, the control unit 51 transmits the carrier signal having the set frequency f1 (S9). After S9, the control unit 51 performs second frequency setting to transmit and receive a carrier signal having the second frequency f2 from the antenna 34 (S10). A process in S10 is performed when the control unit 51 outputs a frequency switching signal to the modulator 63.

In the device 2, the control unit 71 receives a carrier signal corresponding to S9 of the distance measurement unit 14 in the device 1 (S108), and the control unit 71 calculates a receiving signal intensity (RSSI) from a receiving power of the received carrier signal (S109), and calculates a phase of the received carrier signal (S110) in FIG. 14.

In FIG. 16, the foregoing processing represents a transmission/receiving sequence SC1 of the carrier signals.

The control unit 51 controls the transmission unit 32, and transmits the carrier signal having the set frequency 12 (S11) after S10.

In the device 2, after S110, the control unit 71 performs second frequency setting to transmit and receive the carrier signal having the second frequency f2 from the antenna 34 (S111). A process in S111 is performed when the control unit 71 outputs a frequency switching signal to the modulator 83.

In the device 2, the distance measurement unit 24 receives a carrier signal corresponding to S11 of the distance measurement unit 14 in the device 1 (S112), and the control unit 71 calculates a receiving signal intensity (RSSI) from a receiving power of the received carrier signal (S113), and calculates a phase of the received carrier signal (S114).

After S114, the control unit 71 transmits the carrier signal having the set frequency f2 (S115). After S115, the control unit 71 further transmits the carrier signal having the set frequency f2 (S116).

In the device 1, the distance measurement unit 14 receives a carrier signal corresponding to S115 of the distance measurement unit 24 in the device 2 (S12), and the control unit 51 calculates a receiving signal intensity (RSSI) from a receiving power of the received carrier signal (S13), and calculates a phase of the received carrier signal (S14).

Then, the distance measurement unit 14 receives a carrier signal corresponding to S116 of the distance measurement unit 24 in the device 2 (S15), and the control unit 51 calculates a receiving signal intensity (RSSI) from a receiving power of the received carrier signal (S16), and calculates a phase of the received carrier signal (S17).

After S17, the control unit 51 transmits the carrier signal having the set frequency f2 (S18). After S18, the control unit 51 performs third frequency setting to transmit and receive the carrier signal having the third frequency f3 from the antenna 34 (S19). A process in S19 is performed when the control unit 51 outputs a frequency switching signal to the modulator 63.

In the device 2, the control unit 71 receives a carrier signal corresponding to S18 of the distance measurement unit 14 in the device 1 (S117) in FIG. 14, and the control unit 71 calculates a receiving signal intensity (RSSI) from a receiving power of the received carrier signal (S118), and calculates a phase of the received carrier signal (S119), as illustrated in FIG. 15.

In FIG. 16, processes in S10 to S18 and S111 to S119, described above, represent a transmission/receiving sequence SC2 of the carrier signals.

In the device 1, the control unit 51 controls the transmission unit 32, and transmits the carrier signal having the set frequency 3 (S20) after S19.

In the device 2, after S119, the control unit 71 performs third frequency setting to transmit and receive the carrier signal having the third frequency 3 from the antenna 34 (S120). A process in S120 is performed when the control unit 71 outputs a frequency switching signal to the modulator 83.

In the device 2, the distance measurement unit 24 receives a carrier signal corresponding to S20 of the distance measurement unit 14 in the device 1 (S121), and the control unit 71 calculates a receiving signal intensity (RSSI) from a receiving power of the received carrier signal (S122), and calculates a phase of the received carrier signal (S123).

After S123, the control unit 71 transmits the carrier signal having the set frequency f3 (S124). After S124, the control unit 71 further transmits the carrier signal having the set frequency 3 (S125).

The distance measurement unit 14 receives a carrier signal corresponding to S124 of the distance measurement unit 24 in the device 2 (S21), and the control unit 51 calculates a receiving signal intensity (RSSI) from a receiving power of the received carrier signal (S22), and calculates a phase of the received carrier signal (S23).

Then, the distance measurement unit 14 receives a carrier signal corresponding to S125 of the distance measurement unit 24 in the device 2 (S24), and the control unit 51 calculates a receiving signal intensity (RSSI) from a receiving power of the received carrier signal (S25), and calculates a phase of the received carrier signal (S26).

After S26, the control unit 51 transmits the carrier signal having the set frequency (S27).

In the device 2, the control unit 71 receives a carrier signal corresponding to S27 of the distance measurement unit 14 in the device 1 (S126), and the control unit 71 calculates a receiving signal intensity (RSSI) from a receiving power of the received carrier signal (S127), and calculates a phase of the received carrier signal (S128), as illustrated in FIG. 15.

In FIG. 16, processes in S19 to S27 and S120 to S128, described above, represent a transmission/receiving sequence SC3 of the carrier signals.

In the device 2, the control unit 71 transmits phase information of each of the phases respectively calculated in S105, S110, S114, S119, S123, and S128 and information about the receiving signal intensities (RSSI) respectively calculated in S104, S109, S113, S118, S122, and S127 (S129).

In the device 1, the control unit 51 receives the phase information and the receiving signal intensity (RSSI) information from the device 2 in the key K (S28).

In the device 1, the RSSI estimation unit 57 estimates a receiving signal intensity of a frequency fc from the respective six receiving signal intensities of the six frequencies f1, f2, and f3 calculated in S4, S7, S13, S16, S22, and S25 and the six receiving signal intensities received from the device 2 (S29).

For example, a receiving signal intensity in the device 1 is calculated and a receiving signal intensity in the device 2 is calculated for each of the frequencies f1, f2, and f3, an average value of the receiving signal intensities is found for each of the frequencies f1, f2, and f3, and the receiving signal intensity of the frequency fc is estimated using the found three average values.

Note that the receiving signal intensity of the frequency fc may be estimated from only the respective receiving signal intensities of the three frequencies measured and calculated in the device 1, as described above.

In the device 1, the fading correction value calculation unit 58 calculates the fading correction value using the receiving signal intensity of the frequency fc estimated and obtained in S29 and the respective measured receiving signal intensities of the frequencies f1 and f3 (S30).

The distance measurement operation unit 55 calculates a distance from the phase information about the frequencies f1 and f3, and corrects the calculated distance using the fading correction value (S31).

Further, the vernier distance measurement operation unit 54 calculates a distance from the phase information about the frequencies f1, f2, and f3, and corrects the distance calculated by vernier distance measurement using the fading correction value (S32).

The two pieces of distance information respectively calculated in the vernier distance measurement operation unit 54 and the distance measurement operation unit 55 are fed to the processor 11. The processor 11 judges that a relay attack has been performed when either one of the two pieces of distance information exceeds a predetermined distance, and does not output a signal for permitting a control device in the automobile C to unlock the door. The processor 11 judges that a relay attack has not been performed when both the two pieces of distance information are a predetermined distance or less, and outputs a signal for permitting the control device in the automobile C to unlock the door.

As described above, according to the above-described embodiment, there can be provided a distance measurement apparatus and a distance measurement method capable of extending a measurable distance while eliminating a multipath effect.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

What is claimed is:

1. A distance measurement apparatus that calculates a distance based on carrier phase detection, the distance measurement apparatus comprising:
a calculation unit configured to calculate, based on phase information acquired by a first device and a second device at least one of which is movable, a distance between the first device and the second device, wherein the first device comprises
a first reference signal source,
a first transmitter/receiver configured to transmit three first carrier signals respectively having different frequencies and receive three second carrier signals respectively having same frequencies as the frequencies of the three first carrier signals using an output of the first reference signal source, in which a frequency between a lowest frequency and a highest frequency among the three frequencies is a frequency that deviates from an average value of the lowest frequency and the highest frequency,
a first receiving signal intensity measurement unit configured to measure a receiving signal intensity of each of the three second carrier signals,
an estimation unit configured to estimate a receiving signal intensity of the frequency having the average value from at least one of respective three receiving signal intensities of the three first carrier signals and the respective three receiving signal intensities of the three second carrier signals, and
a fading correction value calculation unit configured to calculate a fading correction value for the distance from the receiving signal intensity of the frequency having the average value, the receiving signal intensity of the lowest frequency, and the receiving signal intensity of the highest frequency,
the second device comprises
a second reference signal source configured to operate independently of the first reference signal source, and
a second transmitter/receiver configured to transmit the three second carrier signals and receive the three first carrier signals using an output of the second reference signal source, and
the calculation unit calculates the distance using a phase detection result obtained by receiving the three first carrier signals and the three second carrier signals while correcting the calculated distance using the fading correction value.

2. The distance measurement apparatus according to claim 1, wherein
the first device includes a first phase measurement unit configured to measure a phase of each of the three second carrier signals received in the first transmitter/receiver,
the second device includes a second phase measurement unit configured to measure a phase of each of the three first carrier signals received in the second transmitter/receiver, and
the calculation unit calculates the distance using as the phase information first information about the phase of each of the carrier signal having the lowest frequency and the carrier signal having the highest frequency that are measured in the first phase measurement unit and second information about the phase of each of the carrier signal having the lowest frequency and the carrier signal having the highest frequency that are measured in the second phase measurement unit.

3. The distance measurement apparatus according to claim 1, wherein
the first device includes a first phase measurement unit configured to measure a phase of each of the three second carrier signals received in the first transmitter/receiver,
the second device includes a second phase measurement unit configured to measure a phase of each of the three first carrier signals received in the second transmitter/receiver, and
the calculation unit calculates the distance using as the phase information first information about the phase of each of the three second carrier signals measured in the first phase measurement unit and second information about the phase of each of the three first carrier signals measured in the second phase measurement unit.

4. The distance measurement apparatus according to claim 1, wherein
the calculation unit is provided in the first device, and
the second device transmits to the first device information about a phase of each of the three first carrier signals received in the second transmitter/receiver.

5. The distance measurement apparatus according to claim 1, wherein
the second device includes a second receiving signal intensity measurement unit configured to measure respective receiving signal intensities of the three first carrier signals, and
the second device transmits to the first device information about the respective receiving signal intensities of the three first carrier signals measured in the second receiving signal intensity measurement unit, and
the estimation unit estimates the receiving signal intensity of the frequency having the average value from the respective three receiving signal intensities of the three second carrier signals and the respective three receiving signal intensities of the three first carrier signals received from the second device.

6. A distance measurement method for calculating a distance based on carrier phase detection, the method comprising:
transmitting from a first device three first carrier signals respectively having different frequencies using an output of a first reference signal source; and
transmitting from a second device three second carrier signals respectively having same frequencies as the frequencies of the three first carrier signals using an output of a second reference signal source configured to operate independently of the first reference signal source, wherein
a frequency between a lowest frequency and a highest frequency among the three frequencies is a frequency that deviates from an average value of the lowest frequency and the highest frequency;
measuring a receiving signal intensity of each of the three second carrier signals in the first device;
estimating a receiving signal intensity of the frequency having the average value from at least one of respective three receiving signal intensities of the three first carrier signals and the respective three receiving signal intensities of the three second carrier signals;
calculating a fading correction value for the distance from the receiving signal intensity of the frequency having the average value, the receiving signal intensity of the lowest frequency, and the receiving signal intensity of the highest frequency; and
calculating the distance using a phase detection result obtained by receiving the three first carrier signals and the three second carrier signals while correcting the calculated distance using the fading correction value.

* * * * *